(12) United States Patent
Schweigert et al.

(10) Patent No.: US 9,744,674 B2
(45) Date of Patent: Aug. 29, 2017

(54) GRIPPER AND PROCESS FOR MANUFACTURING A GRIPPER

(71) Applicant: Röhm GmbH, Sontheim/Brenz (DE)

(72) Inventors: Eduard Schweigert, Syrgenstein (DE); Jens Gräβle, Heidenheim (DE)

(73) Assignee: Röhm GmbH, Sontheim/Brenz (DE)

( * ) Notice: Subject to any disclaimer, the term of this patent is extended or adjusted under 35 U.S.C. 154(b) by 0 days.

(21) Appl. No.: 15/251,432

(22) Filed: Aug. 30, 2016

(65) Prior Publication Data

US 2017/0057098 A1    Mar. 2, 2017

(30) Foreign Application Priority Data

Sep. 1, 2015 (DE) .......................... 10 2015 114 556

(51) Int. Cl.
*B25J 15/08* (2006.01)
*B25J 15/00* (2006.01)
*B33Y 80/00* (2015.01)
*B29C 67/00* (2017.01)
*B25J 19/06* (2006.01)
*B25J 19/00* (2006.01)
*B29L 31/00* (2006.01)

(52) U.S. Cl.
CPC .......... *B25J 15/0028* (2013.01); *B25J 15/00* (2013.01); *B25J 15/08* (2013.01); *B25J 19/007* (2013.01); *B25J 19/06* (2013.01); *B29C 67/0051* (2013.01); *B33Y 80/00* (2014.12); *B29K 2995/0046* (2013.01); *B29L 2031/748* (2013.01)

(58) Field of Classification Search
CPC .................................................. B25J 15/0028

USPC ...... 294/192, 196, 106, 116, 902, 195, 99.1; 901/31, 39; 269/25, 32, 33, 34
See application file for complete search history.

(56) References Cited

U.S. PATENT DOCUMENTS 3,620,095 A * 11/1971 Dane ...................... B25J 13/082
                                                            294/111
4,141,138 A *  2/1979 Quick ................ H05K 13/0417
                                                             29/740
(Continued)

FOREIGN PATENT DOCUMENTS

DE       102005046160 C5   12/2008
DE       202009002746 U1    5/2009
(Continued)

OTHER PUBLICATIONS

German Patent and Trademark Office, Search Report for Application No. 10 2015 114 556.1 dated Sep. 1, 2015 (with certified translation) (19 pages).

(Continued)

*Primary Examiner* — Paul T Chin
(74) *Attorney, Agent, or Firm* — McAndrews, Held & Malloy, Ltd.

(57) ABSTRACT

A gripper is described as including two lateral flanks that are directly or indirectly connected to each other at one end, providing a space between them including an actuator, the lateral boundaries of which space have at least one opening accessible from the outside. At least one louver runs across the opening and divides the opening such that the partial surfaces resulting from the louver limit or prevent accessibility to the opening. A method for manufacturing the gripper is also described.

8 Claims, 6 Drawing Sheets

(56) References Cited

U.S. PATENT DOCUMENTS

| | | | | |
|---|---|---|---|---|
| 4,674,946 A * | 6/1987 | Crawford | ............ | B25J 15/0491 |
| | | | | 294/86.4 |
| 4,858,980 A * | 8/1989 | Dreisig | .............. | B23Q 3/15526 |
| | | | | 24/545 |
| 4,874,194 A * | 10/1989 | Borcea | ................... | B25J 15/026 |
| | | | | 294/119.1 |
| 6,467,826 B2 * | 10/2002 | Stromberg | ............... | B21J 15/10 |
| | | | | 294/106 |
| 7,163,247 B2 * | 1/2007 | Stromberg | ............... | B21J 15/10 |
| | | | | 294/86.4 |
| 8,011,708 B2 * | 9/2011 | Becker | .................... | B25J 9/142 |
| | | | | 294/196 |
| 8,186,733 B2 * | 5/2012 | Geary | .................. | B25J 15/0253 |
| | | | | 294/119.1 |
| 8,333,417 B2 * | 12/2012 | Bannasch | .......... | A61B 17/0206 |
| | | | | 294/100 |
| 9,505,135 B1 * | 11/2016 | Malstrom | ............ | B25J 15/0028 |
| 2006/0043749 A1 * | 3/2006 | Huang | ....................... | B25J 7/00 |
| | | | | 294/99.1 |
| 2009/0108605 A1 * | 4/2009 | Becker | .................... | B25J 9/142 |
| | | | | 294/198 |

FOREIGN PATENT DOCUMENTS

| | | |
|---|---|---|
| DE | 102008026534 A1 | 12/2009 |
| DE | 102011011942 A1 | 8/2012 |
| WO | 2015/185493 A1 | 12/2015 |

OTHER PUBLICATIONS

European Patent Office, Search Report for Application No. 16175443.7-1712 dated Feb. 13, 2017 (with certified translation) (17 pages).

* cited by examiner

GRIPPER AND PROCESS FOR MANUFACTURING A GRIPPER

CROSS-REFERENCE TO RELATED APPLICATIONS/INCORPORATION BY REFERENCE

This patent application makes reference to, claims priority to, and claims benefit from German Patent Application No. 10 2015 114 556.1, filed on Sep. 1, 2015. The above-identified application is hereby incorporated by reference herein in its entirety.

FIELD OF THE DISCLOSURE

Some embodiments of the present disclosure relate to a gripper with two lateral flanks that are directly or indirectly connected to each other at one end, generating between them a space including an actuator, with the lateral boundaries of the space having at least one opening that is accessible from the outside. Some embodiments of the present disclosure relate to a process for manufacturing a gripper.

BACKGROUND

Limitations and disadvantages of conventional and traditional approaches will become apparent to one of skill in the art, through comparison of such systems with the present disclosure as set forth in the remainder of the present application with reference to the drawings.

BRIEF SUMMARY

Systems, devices, and methods that provide a gripper are provided, substantially as illustrated by and/or described in connection with at least one of the figures, as set forth more completely in the claims.

DETAILED DESCRIPTION

Figure 1:
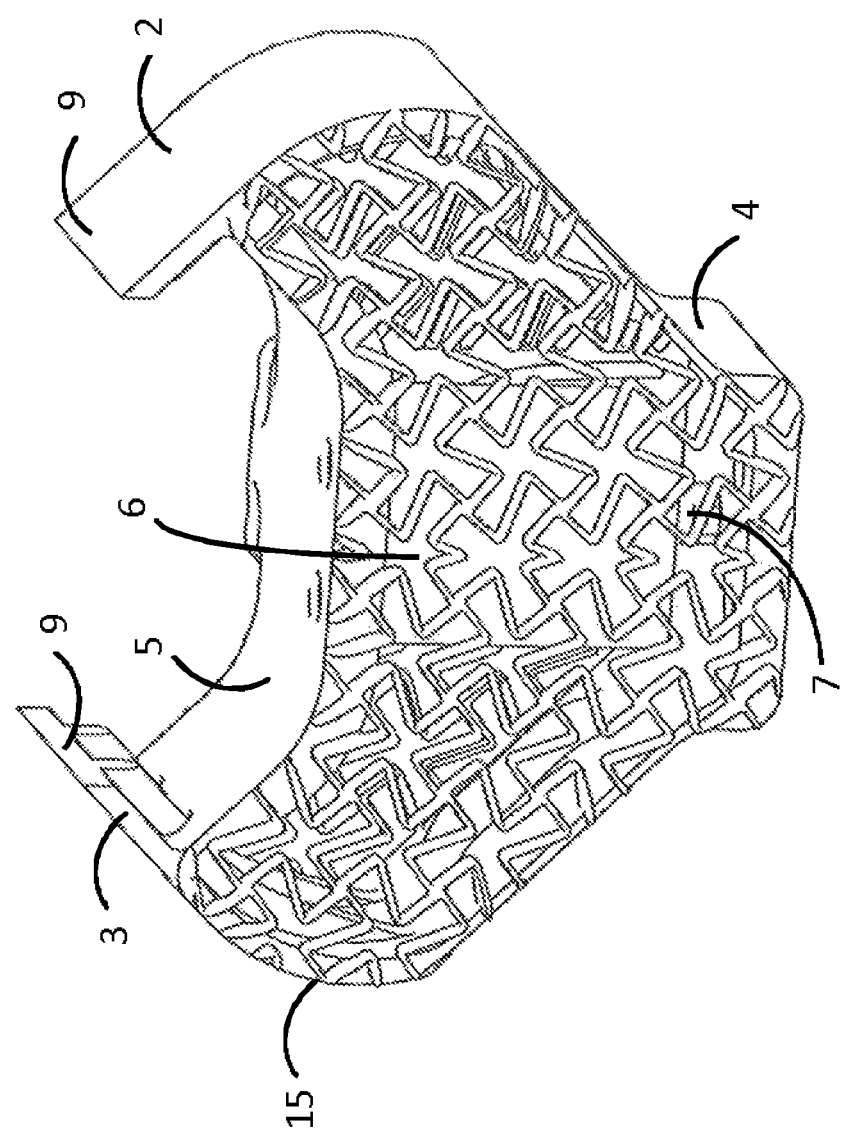
FIG. 1 shows a perspective view of a first embodiment of a gripper according to the present disclosure.
Figure 2:
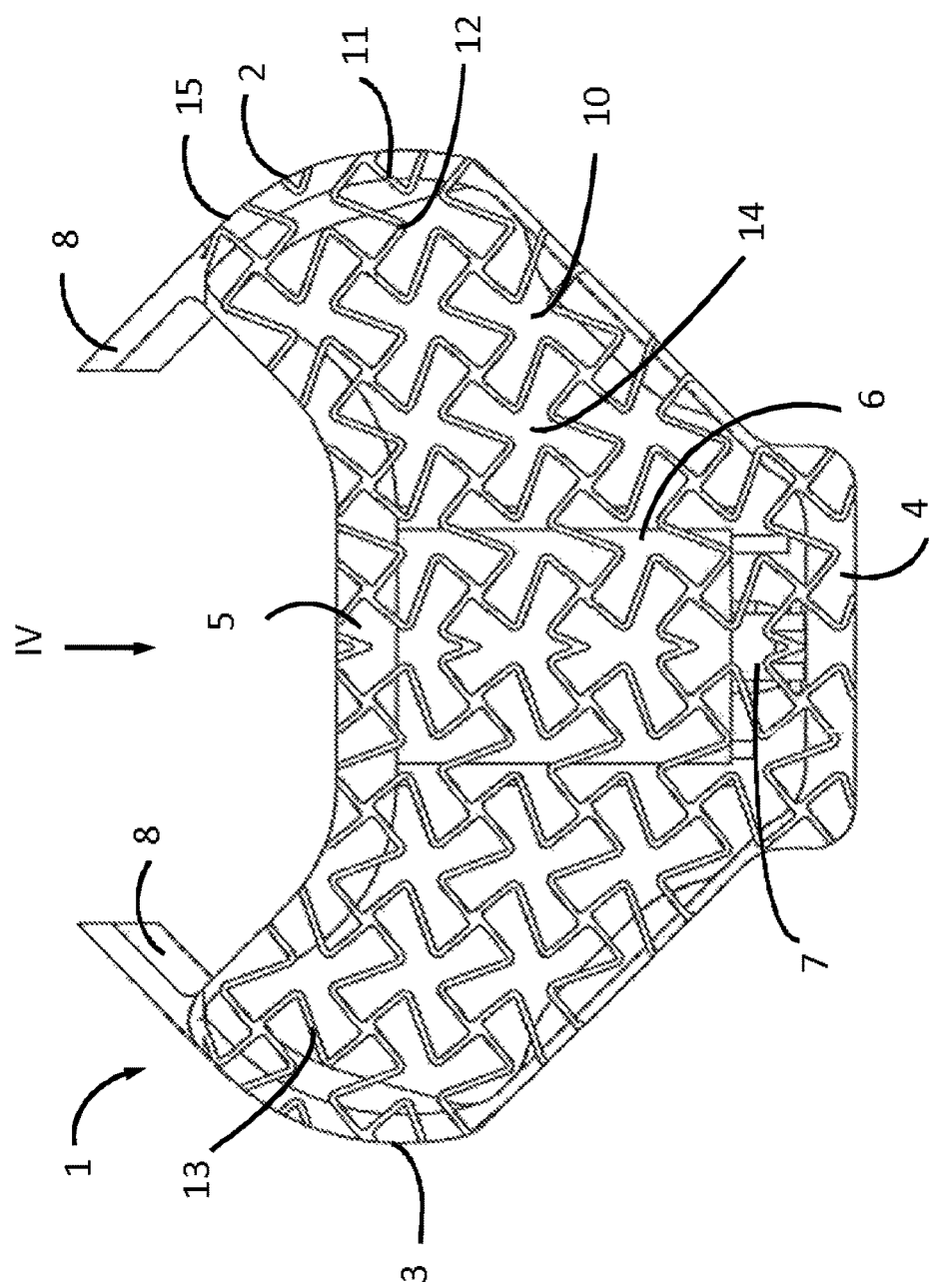
FIG. 2 shows a front view of the gripper shown in FIG. 1 according to the present disclosure.
Figure 4:
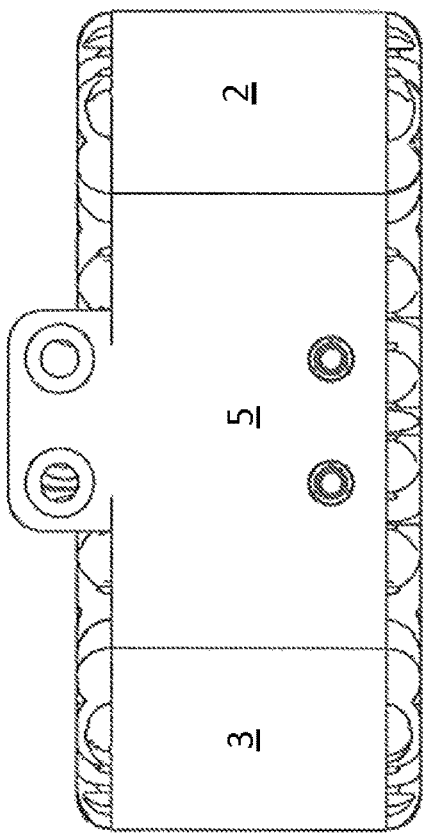
FIG. 4 shows a view from the direction of Arrow IV from FIG. 2 according to the present disclosure.
Figure 3:
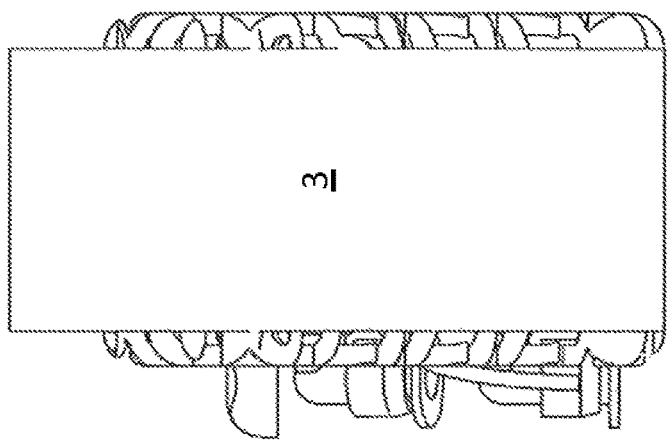
FIG. 3 shows a lateral view of the first embodiment of the gripper according to the present disclosure.

Grippers (e.g., a Röhm gripper RRMG) are used, in particular, for gripping a work piece and changing its position relative to processing or transport devices. These grippers are also used for holding an object in place because, for example, a closure is to be screwed onto a threaded part. Such grippers have proven themselves in practice so that their areas of application have continued to expand. Such grippers are also considered parts of robotic systems, with regard to which certain safety aspects are taken into account so that, during the operation or setup of the robotic systems, risks for the operating personnel can be managed and not feared.

Some embodiments of the present disclosure relate to a gripper with two lateral flanks that are directly or indirectly connected to each other at one end, generating between them a space including an actuator, with the lateral boundaries of the space having at least one opening that is accessible from the outside. Some embodiments of the present disclosure relate to a process for manufacturing a gripper.

Some embodiments of the present disclosure provide a gripper that reduces the risk of injury to the operating personnel. Some embodiments of the present disclosure provide a process for manufacturing a gripper.

Some embodiments of the present disclosure provide a gripper that includes a louver that runs across an opening and divides the opening in such a manner that the partial spaces resulting from the louver reduce or eliminate accessibility.

The actuator is used to switch the gripper between two operating states, for example, an opened configuration, in which the work piece to be gripped is positioned between the free ends of the lateral flanks, and a closed configuration, in which the work piece has been gripped. For switching between the two configurations, the actuator is used, which can be realized, in some embodiments, as a cylinder actuated by a pressure mechanism. For switching the gripper configuration, a risk to the operating personnel results from the movement of the actuator and the resulting switching of the lateral flanks. In particular, a risk results if the operating personnel insert fingers or a hand accidentally or intentionally into the opening that is accessible from the outside. Such operating personnel error is made more difficult or even prevented by some embodiments of the present disclosure that provide a louver that presents a stop or an obstacle to accessibility, especially for a finger.

Some embodiments of the present disclosure provide a support plate that carries or supports the actuator between the lateral flanks at a distance from the free ends of the lateral flanks. Together with the two lateral flanks, the support plate delimits an opening that is accessible from the outside, which may have additional openings at the free ends of the lateral flanks. In particular, the opening including the actuator delimited by the support plate and the lateral flanks can be secured so that, given the size of the opening, several louvers may be used to divide the opening that is accessible from the outside such that the desired effect is that accessibility is made more difficult.

Some embodiments of the present disclosure provide at least one louver that is configured perpendicularly to its longitudinal extension and has at least one dent.

Some embodiments of the present disclosure provide that the louver extending across the opening that is accessible from the outside can be configured as a string or membrane that can be deflected perpendicularly to its longitudinal extension without exerting any force so that, in this regard, the switching of the gripper between its configurations is not counteracted with resistance. It is also possible that the switching of the gripper exerts a force on the louver in its longitudinal extension. Some embodiments of the present disclosure contemplate that, in order for the louver not to function as a strut providing rigidity in this context, a dent is provided, which will result in the louver giving and, in particular, also being able to act as a hinge or with a hinge-like spring effect.

Some embodiments of the present disclosure provide that the at least one louver has a wave shape. This wave shape can also be complex, for example, as a superimposition of several waves.

This wave shape, in turn, is used to minimize the force with which the louver counteracts the switching of the gripper.

For openings that are accessible from the outside and designed to be accordingly large, some embodiments according to the present disclosure provide several louvers to bridge the opening and to be interlinked with each other by cross lands that create a grid structure which prevents, in the case of neighboring louvers extending over greater lengths, the entering of fingers through a space created between the louvers due to the deflection of the louvers in the opposite direction.

Some embodiments of the present disclosure provide for the size of the grid cells of the grid structure to be selected to prevent the sticking of fingers (e.g., adult fingers) through the grid cells. Some embodiments of the present disclosure provide that the grid cells of the grid structure be elastically deformable such that, for example, the force that counteracts the switching of the gripper between its configurations is diminished due to the deformation of the grid structure. Some embodiments of the present disclosure prevent, in particular, that the opening is stiffened by grid rods crossing each other.

In some embodiments of the present disclosure, it has further been proven effective to have at least one louver configured in a plate shape. This allows increasing the mechanical stability of the louver since the louver can have a longer area of contact with the lateral flanks, the support plate or the base plate. This, in turn, will have a positive effect on the operational reliability of the gripper according to some embodiments of the present disclosure, as an accidental entry of the operating personnel into the opening is not possible unless a greater force is applied.

Some embodiments of the present disclosure provide multiple louvers. The individual louvers are, at least in part, staggered. Staggering the louvers ensures that the louvers can move relative to each other without adjacent plates becoming an obstacle. In this context, it has also been proven effective in some embodiments of the present disclosure if the plate-shaped louvers overlap, thereby ensuring that the remaining opening between the louvers is minimized.

Some embodiments of the present disclosure provide a process for manufacturing a gripper in which the lateral flanks are produced in a generative or additive manufacturing step as one piece including the at least one louver. Through the generative or additive manufacturing process, the contact points between the lateral flanks and the at least one louver are already integrated, thus bypassing the assembly of the at least one louver to the lateral flanks after the fact, which might result in a weak point on the gripper, or—in order to avoid such a weak point—in a stiffening. The use of the generative or additive manufacturing step also allows configuring or structuring the at least one louver or the grid structure in a random, highly complex design of individual grid cells in which the grid points as crossing points of the louvers with the cross lands will not contribute to stiffening, but instead—as joints—promote the desired elasticity of the grid cells.

In some of the embodiments, some of which are shown in FIGS. 1-7, a gripper 1 has two lateral flanks 2, 3 that are configured to be curved and are, at one end, connected to each other by a base plate 4. Between lateral flanks 2, 3 and at a distance from their free ends, a support plate 5 is provided on which an actuator 6 is positioned, which is configured as a cylinder actuated by a pressure mechanism according to some embodiments of the gripper 1 shown in FIGS. 1-7. From this cylinder, a translationally adjustable piston rod 7 extends and is fastened to base plate 4 so that when cylinder rod 7 changes position, gripper 1 is deformed, and a work piece can be gripped by the free ends 9 of lateral flanks 2, 3 acting as clamping jaws 8.

Lateral flanks 2, 3 provide between them a space in which the actuator 6 is arranged. This space provided by lateral flanks 2, 3 is open both in the front and in the rear providing, for example, two openings 10 accessible from the outside so that there is a risk to the operating personnel when reaching towards the actuator 6 while using gripper 1, or, in particular, a risk of a finger being pinched between the actuator 6 and lateral flanks 2, 3. In order to reduce or eliminate this risk to the operating personnel, opening 10, which is accessible from the outside, is divided by at least one louver 11 running across opening 10 in such a manner that the partial areas of opening 10 resulting from louver 11 restrict or prevent accessibility. In some embodiments shown in FIGS. 1-7, accessibility is effectively prevented because louver 11, which has a dent 12 perpendicular to its longitudinal extension, is provided multiple times and these louvers 11 are interlinked with each other by cross lands 13 to form a grid structure, in which the size of grid cells 14 has been selected to prevent a finger (e.g., an adult finger) from being stuck through it.

Some embodiments of the present disclosure provide a singular louver 11 that can have several dents 12 giving the louver 11 a wave shape. Grid cells 14 of the grid structure are elastically deformable so that the additional arrangement of the grid structure does not counteract the switching of gripper 1 with a force that limits the functionality of the latter.

Exemplary embodiments of gripper 1 shown in FIGS. 1-7 can be manufactured in a generative or additive manufacturing process in one piece with lateral flanks 2, 3 and the grid structure so that contact points 15 of side flanks 2, 3 with louvers 11 or cross lands 13 can be formed directly during manufacturing.

Some embodiments of the present disclosure provide that the actuator 6 can be positioned on support plate 5 before the space is closed off or becomes inaccessible from the outside by baseplate 4 in the continuation of the manufacturing step.

Figure 5:
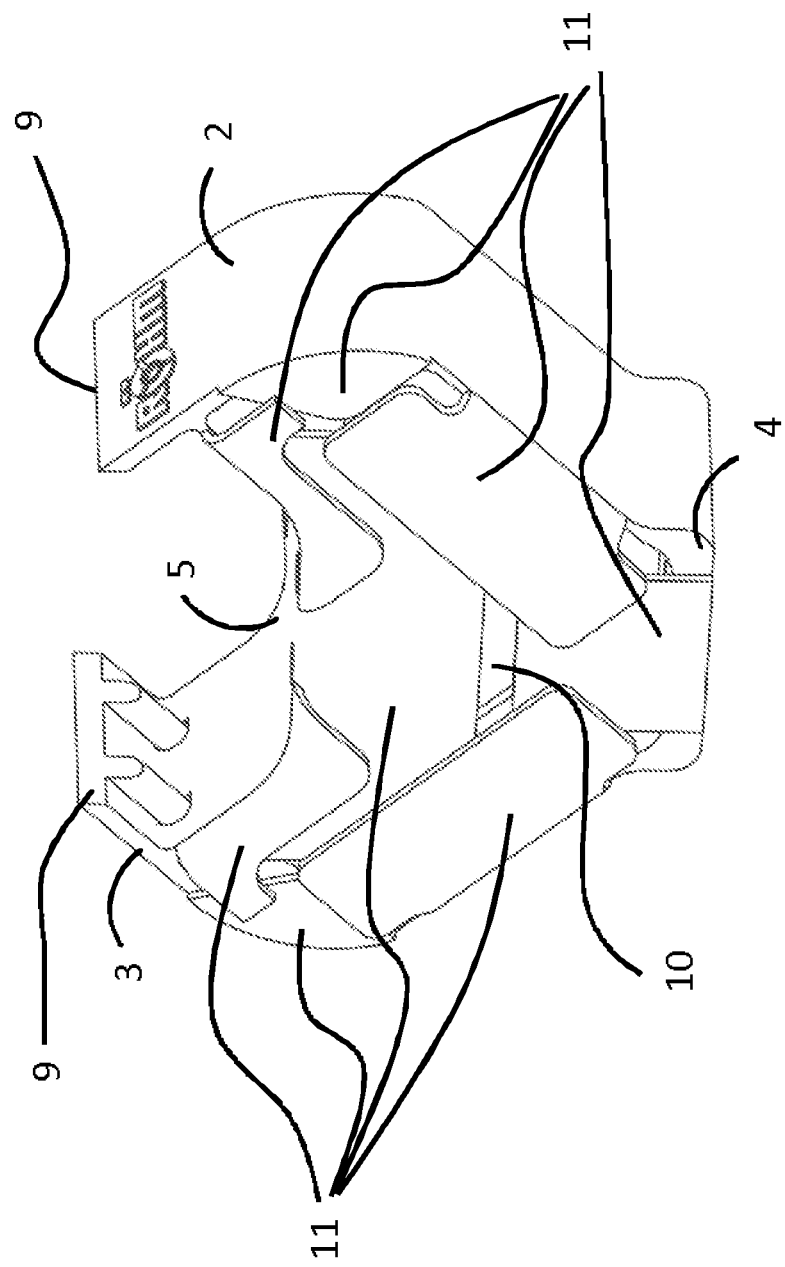
FIG. 5 shows a perspective view of a second embodiment of the gripper according to the present disclosure.

FIG. 5 shows a second embodiment of gripper 1 according to the present disclosure. Louvers 11 are configured like plates and attached to lateral flanks 2, 3, baseplate 4, and support plate 5. Individual louvers 11 are arranged in a staggered formation, and overlap in wide areas to reduce the accessibility of opening 10.

Figure 6:
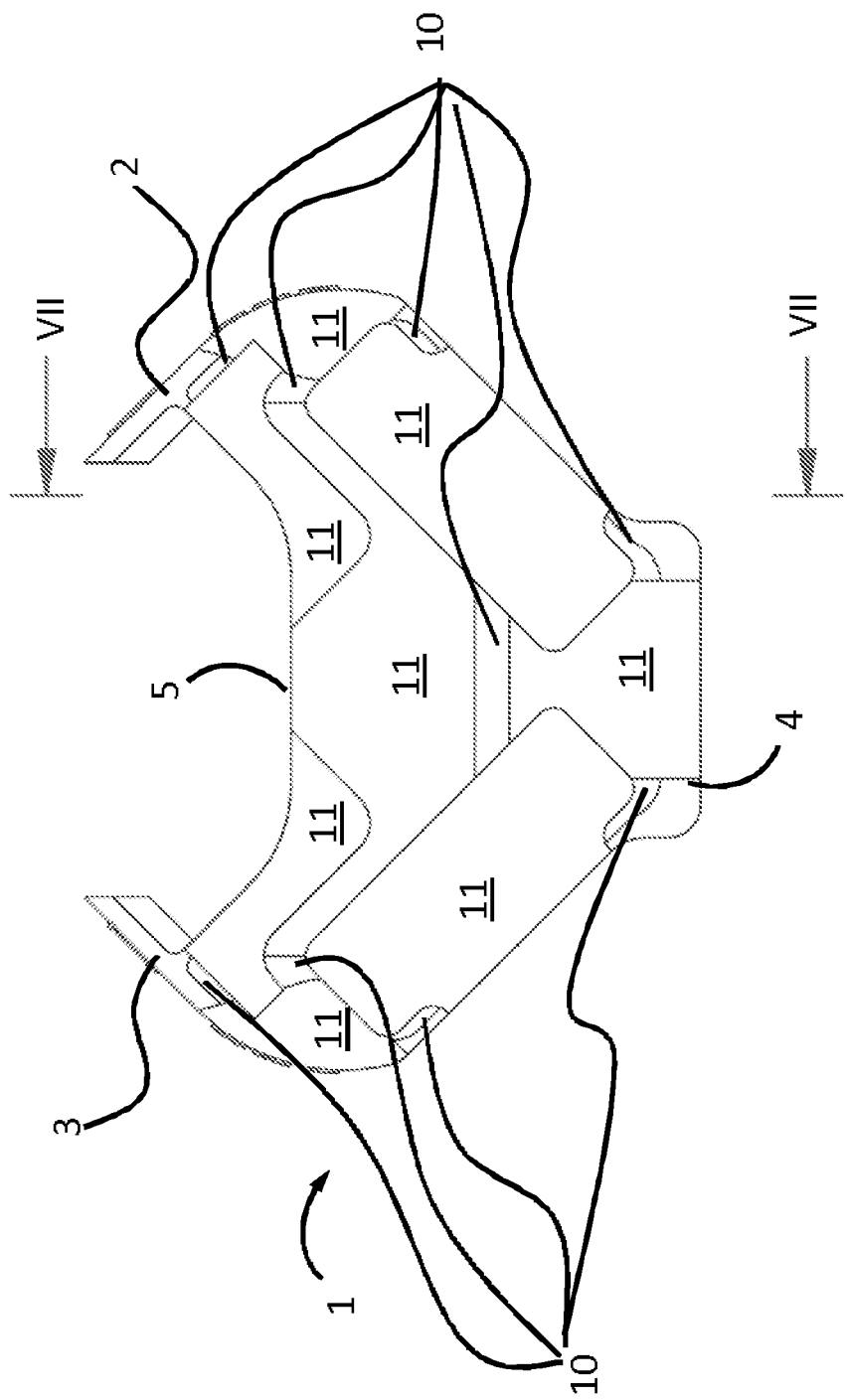
FIG. 6 shows a front view of the second embodiment of the gripper according to the present disclosure.

From FIG. 6, an exemplary embodiment of the gripper 1 restricts the accessibility of opening 10 by the use of plate-shaped louvers 11. The areas remaining between louvers 11 have a size that is apt to prevent a human finger from being stuck into opening 10.

Figure 7:
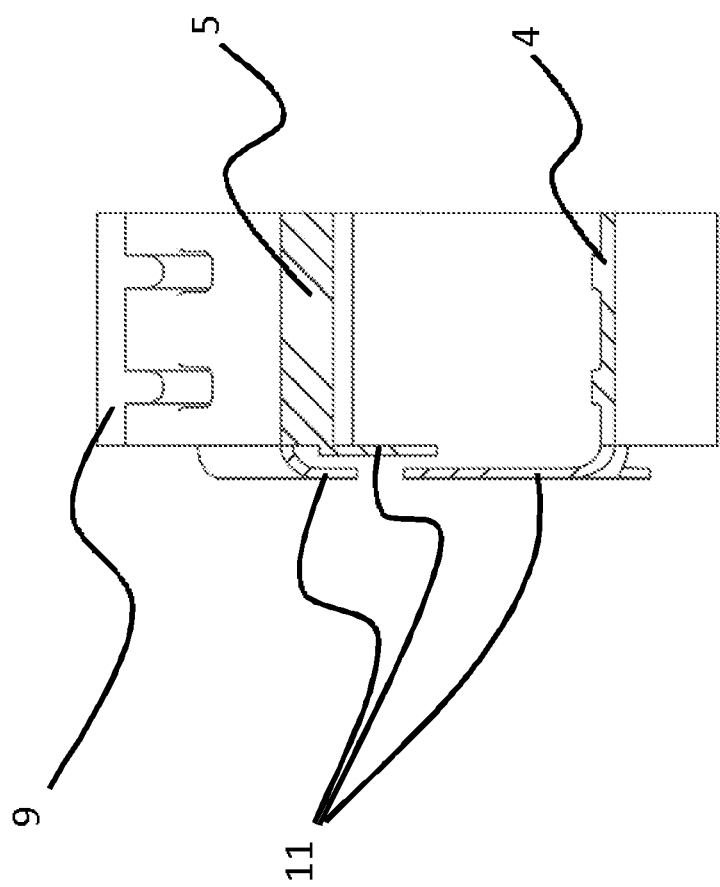
FIG. 7 shows a sectional view along Section VII-VII from FIG. 6 according to the present disclosure.

The staggering and overlapping of plate-shaped louvers 11 can, in particular, also be seen in FIG. 7, which shows the Section VII-VII from FIG. 6.

In the exemplary embodiments of gripper 1 shown in FIGS. 1-7, opening 10, which faces away from the operating personnel, is not covered while gripper 1 is in operation. Thus, the covered opening 10 can be used to insert, and, if desired, bolt down the actuator 6 only after the generative or additive manufacturing of the remaining components of gripper 1.

| Reference list | |
|---|---|
| 1 | Gripper |
| 2 | Lateral flank |
| 3 | Lateral flank |
| 4 | Base plate |
| 5 | Support plate |
| 6 | Actuator |
| 7 | Cylinder rod |
| 8 | Clamping jaw |
| 9 | Free end |
| 10 | Opening |
| 11 | Reinforcement rib |
| 12 | Dent |
| 13 | Cross land |
| 14 | Grid cell |
| 15 | Contact point |

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A gripper, comprising:
a first lateral flank and a second lateral flank that are coupled to each other at respective ends;
an actuator that is disposed in a space formed between the first flank and the second flank, wherein the space has at least one opening that is externally accessible;
at least one louver configured to run across the at least one opening and to divide the at least one opening to restrict accessibility to the space, wherein the at least one louver includes a plurality of louvers that are interlinked by cross lands that form a grid structure; and
a support plate is configured to carry the actuator, wherein the support plate is located between the first lateral flank and the second lateral flank and is at a distance from free ends of the first lateral flank and the second lateral flank.

2. The gripper of claim 1, wherein the at least one louver is configured to prevent accessibility to the space.

3. The gripper of claim 1, wherein the at least one louver is configured to limit or to prevent accessibility to the space by a finger.

4. The gripper of claim 1, wherein the first lateral flank and the second lateral flank are indirectly coupled to each other at the respective ends.

5. The gripper of claim 1, wherein the plurality of louvers are elastically deformable, and are staggered so that the plurality of louvers can move relative to each other.

6. The gripper of claim 1, wherein the at least one louver includes at least one dent disposed in a perpendicular direction to a longitudinal extension of the at least one louver.

7. The gripper of claim 1, wherein the at least one louver is configured in a wave shape.

8. The gripper of claim 1, wherein the first lateral flank, the second lateral flank, and the at least one louver are formed as a single integrated piece by a generative or additive manufacturing process.

* * * * *